(12) United States Patent
Aytug et al.

(10) Patent No.: US 11,325,348 B2
(45) Date of Patent: May 10, 2022

(54) METAL-CARBON COMPOSITES AND METHODS FOR THEIR PRODUCTION

(71) Applicant: UT-Battelle, LLC, Oak Ridge, TN (US)

(72) Inventors: Tolga Aytug, Knoxville, TN (US); Ilia N. Ivanov, Knoxville, TN (US); Mina Yoon, Knoxville, TN (US); Xiangtao Meng, Allentown, PA (US); Soydan Ozcan, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 86 days.

(21) Appl. No.: 15/985,785

(22) Filed: May 22, 2018

(65) Prior Publication Data

US 2018/0339492 A1 Nov. 29, 2018

Related U.S. Application Data

(60) Provisional application No. 62/595,303, filed on Dec. 6, 2017, provisional application No. 62/509,786, filed on May 23, 2017.

(51) Int. Cl.
*B32B 9/00* (2006.01)
*B32B 15/20* (2006.01)
(Continued)

(52) U.S. Cl.
CPC .............. *B32B 9/007* (2013.01); *B32B 15/20* (2013.01); *C01B 32/172* (2017.08);
(Continued)

(58) Field of Classification Search
CPC ...................................................... B05D 1/00
See application file for complete search history.

(56) References Cited

U.S. PATENT DOCUMENTS

| 9,437,372 B1* | 9/2016 | Zhamu | .................... C04B 35/52 |
| 2006/0281306 A1* | 12/2006 | Gstrein | ............. H01L 21/76877 438/666 |

(Continued)

OTHER PUBLICATIONS

Merriam-Webster, www.merriam-webster.com/dictionary/spread. (Year: 2021).*

(Continued)

*Primary Examiner* — Dah-Wei D. Yuan
*Assistant Examiner* — Kristen A Dagenais-Englehart
(74) *Attorney, Agent, or Firm* — Scully, Scott, Murphy & Presser, P.C.

(57) ABSTRACT

A method for producing a carbon nanotube-metal composite in which carbon nanotubes are layered on a metal substrate, the method comprising: (i) depositing a liquid, in which carbon nanotubes are suspended, onto said metal substrate; (ii) during or after step (i), subjecting said liquid to a shearing force sufficient to spatially confine the liquid to induce at least partial alignment of said carbon nanotubes on said metal substrate; and (iii) removing said liquid to produce said carbon nanotube-metal composite; wherein, after step (iii), the lengthwise dimensions of said carbon nanotubes are adhered to and oriented parallel with said metal surface, and said carbon nanotubes are at least partially aligned with each other. In some embodiments, the liquid is deposited in the form of droplets, and the droplets are subjected to a shearing force to cause them to elongate, which induces at least partial alignment of the carbon nanotubes.

21 Claims, 13 Drawing Sheets

(51) Int. Cl.
*C01B 32/174* (2017.01)
*C01B 32/172* (2017.01)

(52) U.S. Cl.
CPC ........ *C01B 32/174* (2017.08); *B32B 2250/03* (2013.01); *B32B 2307/202* (2013.01); *B32B 2310/028* (2013.01); *B32B 2311/12* (2013.01); *B32B 2315/00* (2013.01); *C01B 2202/22* (2013.01)

(56) References Cited

U.S. PATENT DOCUMENTS

| | | | |
|---|---|---|---|
| 2007/0056855 A1* | 3/2007 | Lo | C25D 5/54 205/76 |
| 2008/0044651 A1* | 2/2008 | Douglas | B82Y 10/00 428/339 |
| 2009/0246408 A1* | 10/2009 | Chan | B82Y 10/00 427/577 |
| 2010/0028960 A1* | 2/2010 | Davis | A01N 37/46 435/131 |
| 2010/0261058 A1* | 10/2010 | Lopatin | H01M 4/626 429/212 |

OTHER PUBLICATIONS

Subramaniam C. et al., "One hundred fold increase in current carrying capacity in a carbon nanotube-copper composite", Nature Communications (2013), 4:2202, 7 pages DOI: 10.1038/ncomms3202.

Subramaniam C. et al., "Nano-scale, planar and multi-tiered current pathways from a carbon nanotube-copper composite with high conductivity, ampacity and stability", Nanoscale (2016), 8, pp. 3888-3894 DOI: 10.1039/c5nr03762j.

* cited by examiner

US 11,325,348 B2

METAL-CARBON COMPOSITES AND METHODS FOR THEIR PRODUCTION

CROSS REFERENCE TO RELATED APPLICATION

The present application claims benefit of U.S. Provisional Application No. 62/595,303, filed on Dec. 6, 2017, and U.S. Provisional Application No. 62/509,786, filed on May 23, 2017, all of the contents of which are incorporated herein by reference.

STATEMENT REGARDING FEDERALLY SPONSORED RESEARCH

This invention was made with government support under Prime Contract No. DE-AC05-00OR22725 awarded by the U.S. Department of Energy. The government has certain rights in the invention.

FIELD OF THE INVENTION

The present invention relates to the field of metal-carbon composite materials and methods for producing them, and more specifically, where the carbon is in the form of carbon nanotubes.

BACKGROUND OF THE INVENTION

Ultraconductive materials with a room temperature electrical conductivity exceeding that of copper have been sought for some time, but there has been limited success in producing such materials, particularly by a method that could be economically feasible and scalable to commercial production. A method that could achieve such ultraconductive materials in a scalable and cost-effective manner would represent a significant achievement and would have a substantial technological and economic impact on various energy sectors. In particular, such advanced materials could render existing electrical grid systems and devices substantially more energy efficient, thereby reducing energy and financial loss due to resistive waste heat.

SUMMARY OF THE INVENTION

The instant disclosure is foremost directed to a method for producing a composite in which carbon nanotubes (CNTs) reside on and are affixed to a metal substrate, wherein the lengthwise dimensions of the carbon nanotubes are parallel with the metal surface, and the carbon nanotubes are also at least partially aligned with each other. The layer of carbon nanotubes may be covered (i.e., coated or overlaid) by a layer of metal, which may have the same or different composition than the metal substrate. The carbon nanotube-metal composites described herein have been found to have exceptionally higher electrical and thermal conductivities than the metal alone. Moreover, the method described herein is advantageously economical and scalable, thereby presenting the possibility of significantly advancing the electrical energy and devices industries.

More particularly, the method includes the following steps: (i) depositing a liquid, in which carbon nanotubes are suspended, onto the metal substrate; (ii) during or after step (i), subjecting the liquid to a shearing force sufficient to spatially confine the liquid to induce at least partial alignment of the carbon nanotubes on the metal substrate; and (iii) removal of the liquid to produce the carbon nanotube-metal composite; wherein, after step (iii), the lengthwise dimensions of the carbon nanotubes are adhered to and oriented parallel with the metal surface, and the carbon nanotubes are at least partially aligned with each other. In more particular embodiments, the method includes the following steps: (i) producing droplets of a liquid in which carbon nanotubes are suspended; (ii) depositing the droplets onto the metal substrate; (iii) during or after step (ii), subjecting the droplets to a shearing force sufficient to elongate the droplets and induce at least partial alignment of the carbon nanotubes on the metal substrate; and (iv) removal of the liquid to produce the carbon nanotube-metal composite; wherein, after step (iv), the lengthwise dimensions of the carbon nanotubes are adhered to and parallel with the metal surface, and the carbon nanotubes are at least partially aligned with each other.

In some embodiments, a layer of the same or different metal is coated onto the layer of carbon nanotubes to result in carbon nanotubes sandwiched between the metal substrate and an overlayer of metal. In particular embodiments, the method produces a multilayer structure in which the above-mentioned overlayer of a metal is coated with a second layer of carbon nanotubes. In further embodiments, the second layer of carbon nanotubes in the multilayer structure may be coated with a second overlayer of a metal, which would result in at least two separate layers of carbon nanotubes, with each layer of carbon nanotubes sandwiched by two layers of metal. In yet further embodiments, the second overlayer of metal may be coated with a third layer of carbon nanotubes, which may optionally be coated with a third overlayer of a metal, and with any number of additional layers of alternating carbon nanotubes and metal possible.

DETAILED DESCRIPTION OF THE INVENTION

In one aspect, the present disclosure is directed to a method for producing a composite in which carbon nanotubes (CNTs) reside as a layer on a metal substrate. The CNTs can be any of the single-walled, double-walled, few-walled, or multi-walled carbon nanotubes known in the art, any of which may or may not be heteroatom-doped, such as with nitrogen, boron, oxygen, sulfur, or phosphorus. The CNTs may or may not also be functionalized with any of a variety of solubilizing or hydrophilizing groups, as well known in the art. In the layer of CNTs in the composite, the CNTs in contact with the metal surface are oriented parallel with the surface of the metal substrate. By being parallel, each CNT in contact with the metal surface is in contact with (and adhered to) the metal surface across the full lengthwise dimension of each CNT, which necessarily establishes an angle of zero degrees between the lengthwise dimension of each CNT residing on the metal surface and the metal surface.

Figure 1:
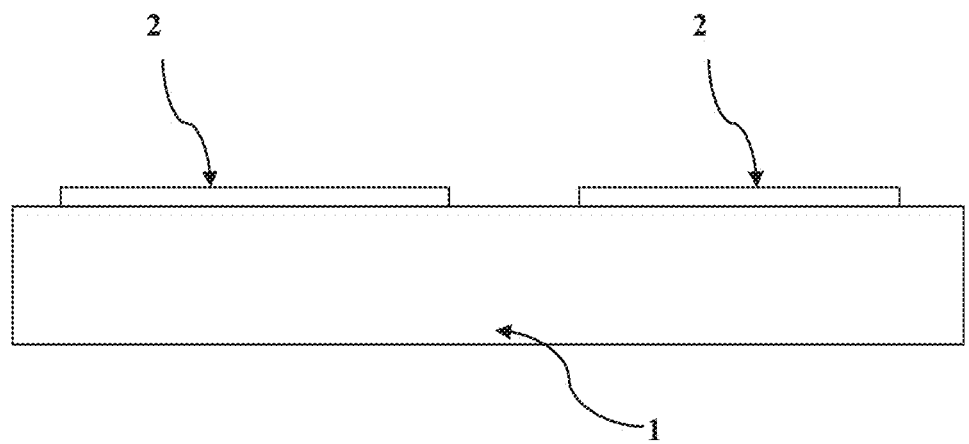
FIG. 1. Drawing depicting CNTs (2) residing on the surface of a metal substrate (1).

FIG. 1 is a drawing that shows the orientation of carbon nanotubes (2) residing on the surface of a metal substrate (1) in the composite produced by the method described herein. Generally, the metal substrate has a smooth surface. The term "smooth," as used herein, may be considered an equivalent of "planar," and refers to the substantial absence of protrusive or depressive features of at least 0.5 or 1 micron in size on the surface of the metal substrate. Such surface features, if present, would likely interfere with the ability of the CNTs to form a parallel and aligned layer of CNTs on the substrate surface. For purposes of the invention, the metal substrate may be considered smooth even if it contains protrusive or depressive features up to or smaller than 0.5 or 1 micron in size. The smooth metal substrate can be either planar or curved on a macroscopic scale (e.g., when viewed over at least 1 mm). By virtue of the very small size of the CNTs, even a curved metal surface will appear planar within the microscopic vicinity of the CNT conformally coating the surface. For purposes of the invention, the term "adhered" refers to the ability of the CNTs to remain affixed to the metal substrate even when subjected to substantial air or liquid flow or mild to moderate abrasive action. In some embodiments, a conformal coating may be placed over the CNTs to further ensure they remain adhered.

The layer of CNTs will generally include the presence of CNTs layering directly on top of CNTs in contact with the metal surface, although a sole monolayer of CNTs adhered to the metal substrate is also considered herein. In the case of CNTs layered on CNTs, the CNTs directly above (some of which are in contact with) the monolayer of CNTs may not be parallel with the metal substrate surface, but the CNTs directly above the monolayer are oriented substantially less than 90 degrees with respect to the metal substrate surface, and more typically, less than 45 degrees with respect to the metal substrate surface. In some embodiments, CNTs directly above the monolayer of CNTs are tending toward parallel (e.g., within ±30, 20, 15, 10, or 5 degrees) with the metal substrate surface and lengthwise dimensions of the monolayer CNTs.

Figure 2:
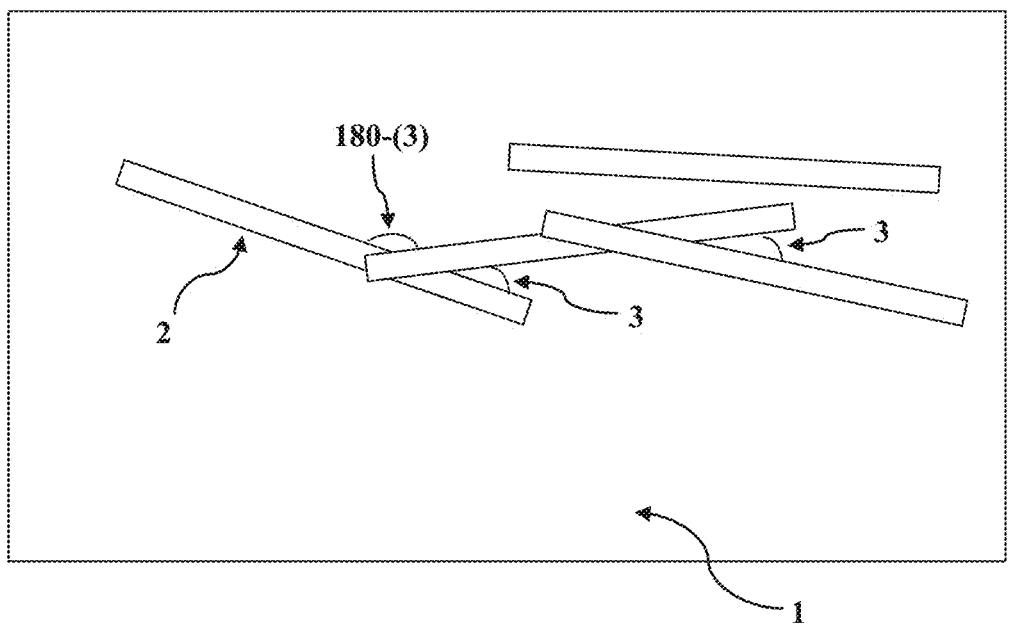
FIG. 2. Drawing showing the angles (3) involved when the CNTs (2) residing on a metal substrate (1) are viewed from overhead.

The CNTs are also at least partially aligned with each other within the monolayer of CNTs on the metal substrate surface (i.e., at least partially aligned within the plane of the metal substrate surface). CNTs above the CNT monolayer are also generally aligned with each other within the plane of the metal substrate surface. By being at least partially aligned, the CNTs intersect at angles that are, on average, no more than or less than 45, 40, 35, 30, 25, or 20 degrees. Stated differently, the CNTs have an average spread of CNT-to-CNT splay angles that is no more than or less than 45, 40, 35, 30, 25, or 20 degrees. The term "intersect" need not require that the CNTs physically intersect; the term also includes where the CNTs are not in physical contact, but the lengths can be extrapolated to determine a virtual intersecting angle. It is also understood that the foregoing acute angles (θ) are adjoined with supplementary obtuse angles of 180-θ, where θ represents any of the foregoing exemplary angles. Thus, by being partially aligned, the CNTs can alternatively be considered as intersecting at angles that are at least or greater than 135, 140, 145, 150, 155, or 160 degrees. FIG. 2 shows the angles involved when the CNTs residing on a metal substrate (1) are viewed from overhead, i.e., CNTs (2) intersect at angles (3) that can be any of the acute exemplary angles provided above.

The CNTs are included in any amount that results in some improvement in either the electrical conductivity, thermal conductivity, and/or mechanical strength of the metal substrate. In some embodiments, the CNTs are included in an amount of about or at least 0.1 vol %, 0.5 vol %, 1 vol %, 2 vol %, 3 vol %, 4 vol %, or 5 vol % by total volume of the carbon nanotube-metal composite. In other embodiments, the CNTs are included in an amount of about or up to, for example, 10, 20, 25, 30, 35, 40, 45, or 50 vol %, or an amount within a range bounded by any two of the foregoing values. Any minimum and maximum amounts from the foregoing separate values may be combined to form a range. The vol % of CNTs and the degree of alignment of the CNTs with each other can be independently controlled to result in the composite possessing a room temperature electrical and/or thermal conductivity exceeding that of the metal alone.

The metal substrate can be composed of any one or more elements in their metallic (zerovalent) states and which could benefit by being enhanced in electrical conductivity, thermal conductivity, and/or mechanical strength, all of which the CNTs impart to the metal substrate. In a first set of embodiments, the metal substrate includes or is composed solely of a transition metal, i.e., any of the elements of Groups 3-12 of the Periodic Table. The transition metal can be selected from, for example, Group 3 (Sc or Y), Group 4

(Ti, Zr, or Hf), Group 5 (V, Nb, or Ta), Group 6 (Cr, Mo, or W), Group 7 (Mn, Tc, or Re), Group 8 (Fe, Ru, or Os), Group 9 (Co, Rh, or Jr), Group 10 (Ni, Pd, or Pt), Group 11 (Cu, Ag, or Au), or Group 12 (Zn or Cd). In a second set of embodiments, the metal substrate includes or is composed solely of a main group element, e.g., any of the metallic elements of Group 13 (i.e., Al, Ga, or In) and/or Group 14 (i.e., Si, Ge, Sn, or Pb) of the Periodic Table. For purposes of the invention, the metal substrate does not include solely carbon as a Group 14 element. In a third set of embodiments, the metal substrate includes or is composed solely of an alkaline earth metal, such as magnesium. When two or more metallic elements are included in the metal substrate, the two or more elements may be selected from among any of the exemplary metals provided above, and the two or more elements may form either an alloy or a composite containing one or more discrete layers or regions of different metals. In more specific embodiments, the metal substrate is composed solely of or is an alloy of copper. The alloy of copper includes copper and any one or two of the above exemplary metals. In some embodiments, the metal substrate may or may not be a carbide, silicide, or nitride of any of the metals provided above, in which case the metal may not be considered to have a formal zerovalent charge. In some embodiments, any one or more of the foregoing exemplary classes or specific types of elements are excluded from the metal substrate.

The metal substrate can have any useful thickness. In some embodiments, the metal substrate is a metal tape or foil. The metal substrate can be considered a tape or foil if the substrate is thin enough to be flexible when subjected to a light bending force (e.g., 20-100 psi). A tape or foil is often used in a wound state. The tape or foil generally has a thickness within a range of 1-1,000 microns. In different embodiments, the tape or foil has a thickness of, for example, precisely, at least, or greater than 1, 10, or 25 microns and up to or less than 50, 100, 200, 500, or 1000 microns. In other embodiments, the metal substrate is in the form of a wire, such as a round wire.

In the initial part of the method for producing the composite, a suspension or dispersion containing the CNTs (suspended or dispersed in a liquid) is deposited on the metal substrate. In some embodiments, such as where air pressure is subsequently used to deform the liquid, the CNT suspension is placed on the metal surface and air pressure is used to spread the liquid over the metal surface. In other embodiments, the suspension containing the CNTs is in the form of droplets that are deposited on the metal substrate. This deposition step of the CNT suspension can be referred to as a first step, or step (i). The liquid should be capable of suspending the CNTs and is preferably not high boiling, since the liquid will need to be removed later on to produce the final composite. The liquid preferably has a boiling point of no more than or less than 150° C., 120° C., or 100° C. In some embodiments, the liquid is or includes water, i.e., it is an aqueous liquid. In the case of an aqueous liquid that is not pure water, the liquid may include water in a predominant amount of at least 50, 55, 60, or 70 vol %, admixed with a water-soluble organic solvent, such as an alcohol, acetone, or tetrahydrofuran. In other embodiments, the liquid is or includes an organic solvent in a predominant amount. The organic solvent may be, for example, an alcohol, ether, ketone (e.g., acetone), hydrocarbon (e.g., hexane, cyclohexane, or toluene), or chlorohydrocarbon (e.g., methylene chloride or chloroform). The droplets can have any suitable size, as long as the size does not substantially hinder the successful completion of subsequent steps in the method, e.g., deposition of CNTs, elongation, etc. Typically, the droplets have an average size of about or at least 50, 100, 150, 200, 250, 300, 350, 400, 450, 500, 550, or 600 microns, or a droplet size within a range bounded by any two of the foregoing values.

In step (i), if droplets are used, the droplets can be produced by any method capable of producing droplets from the liquid suspension of CNTs. For purposes of the present invention, the droplet generation method should produce a large number of droplets (e.g., thousands) within a short timeframe (e.g., less than one second), such as in the production of a mist. Each droplet typically includes hundreds or thousands of CNTs, depending on the size of the droplets. In one embodiment, the suspension is in contact with a pressurized spraying or misting device that contains a spray nozzle or gun, as well known in the art, to generate droplets of the suspension. In another embodiment, the droplets are produced by subjecting the suspension to ultrasound, such as in a sonospray method in which the suspension is delivered to an ultrasonically activated sonohead oscillating at an effective ultrasound frequency, e.g., 40, 50, 80, 100, 120, 150, 180, 200, 250, 500, 750, or 1000 kHz or a range therein. The sonospray method for droplet generation is well known in the art, and may also be referred to as an atomizing or nebulizing method. In another embodiment, the droplets are produced by an electrospinning (electrospraying) method in which the suspension is electrically charged and of opposite polarity to the metal substrate. The voltage drop between the suspension and metal substrate should be of sufficient magnitude to result in ejection of droplets from the suspension, with the droplets impinging on the metal substrate. Any mechanism for delivering the suspension (feed) solution to the droplet generation device is considered herein. In particular embodiments, the feed solution can be contained in and delivered to the droplet generation device from a syringe pump.

In one embodiment, the CNT suspension source contains only CNTs suspended in a liquid, which results in droplets with the same two components. In another embodiment, the CNT suspension source further contains a surfactant, which results in droplets containing CNTs, a liquid, and a surfactant. The primary purpose of the surfactant is to aid in the suspension (dispersion) of the CNTs in the liquid. Nevertheless, the surfactant may also function as a viscosifier, which can improve the ability of the droplet to elongate in a subsequent part of the method, as further discussed below. That is, the surfactant can make the droplet more deformable when the droplet is subjected to a shearing force. The surfactant can be any surfactant known in the art, including molecules and polymeric materials having surface active properties. The surfactant may also be ionic (e.g., anionic or cationic) or non-ionic. Generally, as well known in the art, the surfactant includes hydrophilic and hydrophobic portions. Some examples of surfactant molecules include dodecyl sulfate (SDS), sodium dodecylbenzene sulfonate (NaDDBS), sodium lauryl sulfate, perfluorooctanesulfonate, cetyltrimethylammonium bromide, benzalkonium chloride, cocoamidopropyl betaine, pentaethylene glycol monododecyl ether, the nonoxynols, sorbitan monolaurate, decyl glucoside, and cocamide monoethanolamine. Some examples of surfactant polymers include Triton X-100, polyethoxylated tallow amine, the poloxamers (both diblock and triblock), the polysorbates, and numerous amphiphilic block copolymers, such as polystyrene-b-poly(methylmethacrylate) (i.e., PS-PMMA), polystyrene-b-poly(acrylic acid) (i.e., PS-PAA), polystyrene-b-poly(4-vinylpyridine) (i.e., PS-P4VP), polystyrene-b-poly(2-vinylpyridine) (i.e., PS-P2VP), polyethylene-b-poly(4-vinylpyridine) (i.e., PE-P4VP), polystyrene-b-polyethyleneoxide (i.e., PS-PEO), polystyrene-b-poly(4-hydroxystyrene), polyethyleneoxide-b-polypropyleneoxide (i.e., PEO-PPO), polystyrene-b-polyacrylonitrile (i.e., PS-PAN), and polyethyleneoxide-b-polyacrylonitrile (i.e., PEO-PAN).

In the case of suspension droplets, once the droplets of the CNT suspension solution are produced, the droplets are deposited onto the metal substrate. The foregoing deposition process may herein be referred to as a second step, or step (ii). Any means for directing the droplets to the metal substrate are considered herein. For example, a gaseous flow (i.e., stream or jet) may be used to direct the droplets to the metal substrate. Alternatively, for example, the droplets may be directed to the metal substrate by electrical charging of the droplets and by establishing a voltage drop between the droplets and the metal substrate, such as occurs in the electrospraying method.

During or after the CNT suspension deposition step, the suspension (which may be in continuous form on the metal surface or in the form of droplets on the metal surface) is subjected to a shearing force sufficient to spread the liquid or elongate the droplets, which induces at least partial alignment of the CNTs with respect to each other, in the manner discussed above (e.g., FIG. 2). By spreading the continuous suspension on the metal surface, such as by applying gas flow, the CNTs at least partially align along their lengthwise dimensions in response to the increased spatial confinement. Similarly, by elongating the droplet, the CNTs become more confined, which causes the CNTs to align their lengthwise dimensions with the lengthwise dimension of the elongated drop, in order for the CNTs to fit within the more confined space. The shearing step can herein be referred to as a third step, or step (iii). In the case of droplets, the end result is the presence of elongated droplets on the metal surface, whether the droplets are elongated during or after deposition of the droplets on the metal surface.

Figure 3:
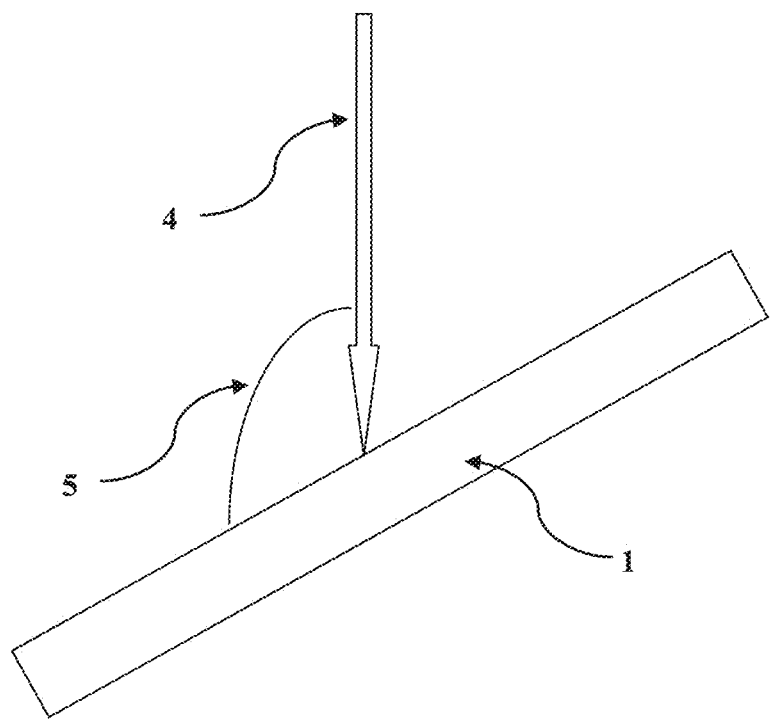
FIG. 3. Drawing showing orientation of a stream of droplets (4) impinging on a metal substrate (1), with the metal substrate oriented at a substantially oblique angle (i.e., (5), which is substantially more than 90 degrees, e.g., 120-160 degrees).

By a first embodiment for elongating the droplets, droplets produced by any of the methods described above (e.g., by sonospray) are directed by a gaseous stream or jet to the metal substrate, with the metal substrate oriented at a substantially oblique angle (i.e., substantially more than 90 degrees, e.g., 120-160 degrees) with respect to the direction of the gaseous stream or jet when the droplets impinge on the metal substrate. FIG. 3 is a drawing showing the angle referred to above. As shown in FIG. 3, a stream of droplets (4) flows in a direction denoted by the arrow towards the metal substrate (1) at an angle (5) between the direction of flow of the droplets and the metal substrate that is greater than 90 degrees. It is understood that the angle between the stream of droplets and metal substrate can equivalently be stated as being substantially less than 90 degrees, since the angle (5) has an adjoining supplementary angle (5') of 180-(5). Thus, if the supplementary angle (5') is referred to, the angle can be equivalently stated as being, e.g., 20-60 degrees. In order for the droplets to be deposited on the metal substrate, the metal substrate should not be parallel to the stream of droplets. That is, the metal substrate should be oriented substantially less than 180 degrees (or equivalently, substantially more than 0 degrees). The sloped orientation of the metal substrate with respect to the stream of droplets, coupled with a sufficient velocity of the droplets in the stream, is instrumental in providing sufficient shear to elongate the droplets as the droplets impinge on the surface.

By a second embodiment for elongating the droplets, droplets produced by any of the methods described above are directed by a gaseous stream or jet to the metal substrate while the gaseous stream or the metal substrate are being moved with respect to each other. In one embodiment, the stream of droplets is fixed in position while the metal substrate is moved in position. The metal substrate may be macroscopically planar, in which case the metal substrate is horizontally displaced at a desired linear speed, or the metal substrate is curved, such as a metal tape or foil on a cylinder, in which case the metal substrate is rotated at a desired rotational speed. In another embodiment, the metal substrate is fixed in position while the stream of droplets is moved over the metal substrate. If desired, the stream of droplets and metal substrate may both be moved with respect to each other. Regardless of the method used, the end result is the deposition of the droplets containing the CNTs across a desired surface area of the metal substrate. Depending on the speed of the movement, the movement may also contribute to the shear on the droplets, thereby contributing to the elongation of the droplets.

By a third embodiment for elongating the droplets, droplets that have been deposited on the metal substrate by any suitable method, as discussed above, are subjected to a sufficiently forceful gas flow (e.g., air flow) to result in elongation of the droplets on the surface of the metal substrate. The foregoing method may be referred to as an "air knife method". To induce deformation of the droplets in the air knife method, the direction of the gas flow should be at an oblique angle with respect to the metal substrate surface. That is, the angle between the direction of the gas flow and metal substrate surface should be substantially non-perpendicular and non-parallel (e.g., an angle of 110-160 degrees) when the gas flow impinges on the droplets residing on the metal substrate surface. The oblique angle significantly contributes to the ability of the gas flow to provide sufficient shear on the droplets in order for the droplets to become elongated. Notably, as indicated earlier above, the air knife method can be used to apply shear on a continuous film of the CNT suspension on the metal surface, instead of applying shear on droplets of the suspension.

By a fourth embodiment for elongating the droplets, an electrospray method is used to create electrically charged droplets containing the CNTs from a source of the suspension containing the CNTs. A voltage dropped is established between the charged droplets and the metal substrate when the droplets are not in contact with the metal substrate, which results in a rapid acceleration of the droplets toward the metal substrate. To induce elongation of the droplets, the metal substrate is made to move at sufficient speed, relative to the direction of flow of droplets produced by the electrospray method, to subject the droplets to sufficient shear to result in their elongation. Typically, the metal substrate is made to move while the flow of charged droplets from the sonohead remains fixed. For example, in the case of a macroscopically planar metal substrate, the metal substrate is horizontally displaced (i.e., within the plane established by the metal surface) at a desired linear speed while the flow of charged particles is fixed in position. Alternatively, if the metal substrate is curved, such as a metal tape or foil on a cylinder, the metal substrate is rotated at a desired rotational speed while the flow of charged particles is fixed in position. In another embodiment, the flow of charged droplets from the sonohead moves at a desired speed over the surface of the metal substrate while the metal substrate remains fixed in position. Regardless of the method used, the end result is the deposition of the droplets containing the CNTs across a desired surface area of the metal substrate.

Following deposition and shearing of the CNT suspension containing the CNTs on the metal substrate, the liquid portion of the CNT suspension is removed. The liquid removal step can herein be referred to as a drying step, which can be a fourth step, i.e., step (iv). In a first embodiment, the liquid is removed by air drying, which may use static air or flowing air. The air knife method, described above, may function to both elongate the droplets and also air dry. In a second embodiment, the liquid is removed by reducing the gaseous pressure surrounding the droplets. The reduced pressure is below atmospheric pressure, e.g., below 1 atm. In a third embodiment, the liquid is removed by heating the metal substrate and/or gaseous environment around the droplets. The temperature used may be at, below, or above the boiling point of the liquid. In some embodiments, the temperature used in the drying step is up to or below 200, 150, 100, or 50° C. However, the metal substrate containing the sheared CNT suspension may be subjected to higher temperatures capable of removing both the solvent and a surfactant, if present. In that case, the drying step may be referred to as a volatilization step. To effect volatilization of the surfactant, the drying/volatilization step may employ a temperature of about or at least, for example, 250, 300, 350, 400, 450, 500, 550, or 600° C., or a temperature within a range bounded by any two of the above exemplary temperatures.

In some embodiments, after the CNTs are on the surface of the metal substrate, the CNT-metal substrate composite is subjected to an annealing step, also herein referred to as a post-annealing step. The annealing step results in greater adherence of the CNTs to the metal surface. In the annealing step, the CNT-metal substrate composite is treated at an annealing temperature, which, as well known in the art, is a temperature above the recrystallization temperature of the metal, and at which the metal softens without fully melting. As each metal has its own unique melting point and recrystallization temperature, each metal may have a different suitable range in temperature for the annealing process. The annealing temperature may be, for example, about 50, 100, 200, 300, 400, or 500° C. below the melting point of the metal. For example, in the case of copper, which has a melting point of ca. 1085° C., the annealing step may be conducted at about 500° C., 600° C., 700° C., 800° C., 900° C., 1000° C., or a temperature within a range bounded by any two of the foregoing temperatures. A copper alloy may be more suitably annealed with a higher or lower annealing temperature than the range provided above for copper. Generally, the CNTs are stable up to a temperature of about 1300° C.; thus, the annealing process will generally employ a temperature of less than 1300° C. In some embodiments, an annealing temperature in the range of 300-1000° C. is used. Generally, the annealing process is conducted for sufficient time to result in substantial diffusion of metal into voids between the carbon nanotubes and metal, thereby substantially eliminating such voids.

In one embodiment, an annealing step is conducted on the composite after the drying step, in which case the annealing step can be referred to as a fifth step, i.e., step (v). In the case where the drying step also involves heating, the annealing step may begin after the drying step has been completed and after the composite cooled partially or completely. Alternatively, the composite may be subjected to a heated drying step, which then continues with further heating into an annealing step. In another embodiment, the annealing step functions as step (iv), by functioning the dual purpose of removing the liquid and surfactant from the droplets and annealing. In some embodiments, the annealing step is conducted under a reduced oxygen atmosphere. The reduced oxygen level may be achieved by, for example, diluting or replacing air in the chamber containing the composite with an inert gas (e.g., Ar) and/or reducing gas (e.g., $H_2$). Alternatively, or in addition, the reduced oxygen level may be achieved by lowering the pressure in the chamber to below ambient pressure (i.e., below 1 atm). The pressure in the chamber may be lowered to, for example, 0.5 atm, 0.1 atm, 0.01 atm, 0.001 atm, 0.0001 atm, or lower.

Figure 4:
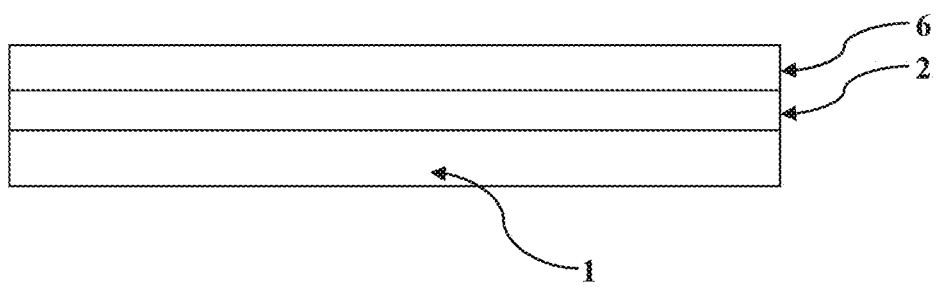
FIG. 4. Drawing showing an exemplary multilayer composite structure in which a metal substrate (1) is coated with a layer (first layer) of CNTs (2), and the first layer of CNTs is overcoated with a first overlayer (6) of a metal.

In some embodiments, the layer of CNTs on the metal substrate, after a drying step or annealing step (iv), or after a drying step (iv) followed by a separate annealing step (v), is coated with a layer (i.e., overlayer) of the same or different metal, thereby sandwiching the CNT layer between the metal substrate and overlayer. A representation of the overlaid composite structure is provided in FIG. 4. As shown in FIG. 4, the metal substrate (1) is coated with a layer (first layer) of CNTs (2), and the first layer of CNTs is overcoated with a first overlayer (6) of a metal. The first overlayer of metal may be composed purely of one or more metals in their zerovalent states, or may be composed of a durable metal-containing composition containing one or more metals and one or more Group 14 or 15 elements, e.g., a metal carbide, metal silicide, metal nitride, metal oxide, or metal sulfide. The first overlayer of metal can be deposited by any means known in the art. Preferably, the overlayer deposition method provides a uniform and level coverage of the CNTs and the filling of fine spaces. The method for depositing an overlayer of metal may be a physical vapor deposition (PVD), chemical vapor deposition (CVD) method, or solution deposition method. Some examples of PVD methods include sputter deposition (e.g., DC-sputtering or RF-sputtering), pulsed laser deposition (PLD), electron beam deposition, molecular beam epitaxy (MBE), evaporative deposition, electrodeposition, electroless deposition, and cathodic arc deposition. Some examples of CVD methods include metal organic chemical vapor deposition (MOCVD) and plasma-enhanced CVD (PECVD). Some examples of solution deposition methods include electrodeposition, sol-gel dip coating, and slot die coating. In some embodiments, the first overlayer of metal is the only overlayer of metal in the composite. In other embodiments, as discussed in further detail below, the composite structure contains additional layers of alternating CNT and metal layers, in which case a multilayer composite structure is built.

The metal overlayer can have any suitable thickness, as discussed above for the metal substrate, e.g., within a range of 1-1,000 microns, such as, for example, precisely, at least, or greater than 1, 10, or 25 microns and up to or less than 50, 100, 200, 500, or 1000 microns. In some embodiments, the metal overlayer has a thickness in the nanometer to lower micron range, e.g., 10 nm, 20 nm, 50 nm, 100 nm, 200 nm, 300 nm, 400 nm, 500 nm, 1000 nm, 2000 nm, 3000 nm, 4000 nm, or 5000 nm, or a thickness within a range bounded by any two of the foregoing values, e.g., 10-5000 nm, 10-1000 nm, or 10-500 nm.

After a metal overlayer is deposited, the resulting composite structure is typically annealed at an annealing temperature, as discussed above. The annealing process should result in the filling of gaps (voids) between CNTs and possibly within the CNTs. In some cases, the annealing process results in the partial or complete filling of inner portions of the CNTs. The annealing process also ensures strong adherence of the CNTs to the metal substrate and metal overlayer. The annealing process is also typically performed in an atmosphere substantially diminished in oxygen, as also discussed above.

Figure 5:
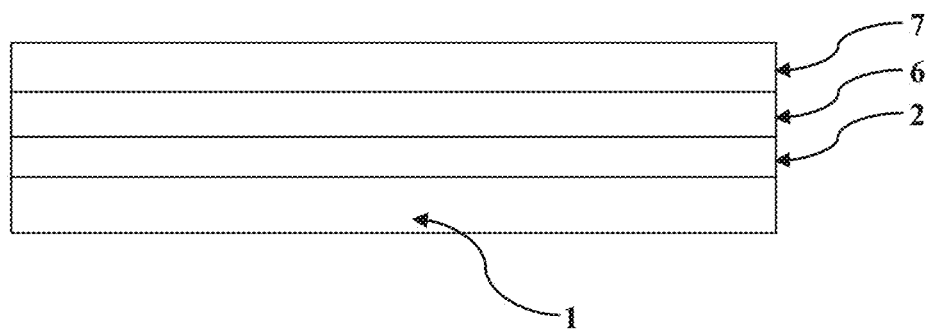
FIG. 5. Drawing showing an exemplary multilayer composite structure in which a metal substrate (1) is coated with a first layer (2) of CNTs; the first layer of CNTs is overcoated with a first overlayer (6) of a metal; and the first overlayer of the metal is coated with a second layer (7) of CNTs.
Figure 6:
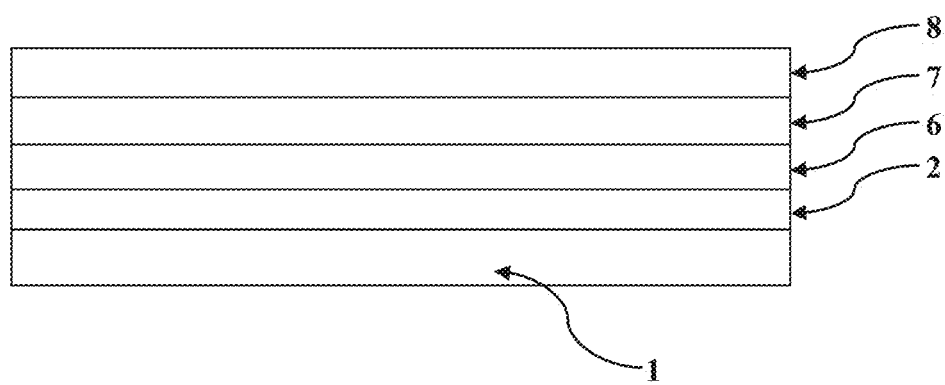
FIG. 6. Drawing showing an exemplary multilayer composite structure in which a metal substrate (1) is coated with a first layer (2) of CNTs; the first layer of CNTs is overcoated with a first overlayer (6) of a metal; the first overlayer of the metal is coated with a second layer (7) of CNTs; and the second layer of CNTs is overcoated with another (i.e., second) overlayer (8) of a metal. In the foregoing multilayer structure, at least two separate layers of carbon nanotubes are present, with each layer of carbon nanotubes sandwiched by layers of metal, wherein the bottom-most layer of metal is a metal substrate (1).

In some embodiments, the method builds on the sandwiched structure described above (as shown in FIG. 4) to produce a multilayer structure. In a simple multilayer structure, the first overlayer of metal may be coated with a second layer (coating) of CNTs, as generally depicted in FIG. 5. As shown in FIG. 5, the metal substrate (1) is coated with a first layer (2) of CNTs, and the first layer of CNTs is overcoated with a first overlayer (6) of a metal, and the first overlayer of the metal is coated with a second layer (7) of CNTs. Generally, the multilayer structure contains an overlayer of a metal as the last layer opposite the metal substrate. For example, the rudimentary multilayer structure shown in FIG. 5 can be overcoated with another (i.e., second) overlayer (8) of a metal. The foregoing type of multilayer structure is depicted in FIG. 6. In the multilayer structure shown in FIG. 6, at least two separate layers of carbon nanotubes are present, with each layer of carbon nanotubes sandwiched by layers of metal, wherein the bottom-most layer of metal is said smooth metal substrate. The second overlayer (8) of metal may independently be composed of any of the compositions provided above for the first overlayer of metal and metal substrate. Nevertheless, in some embodiments, an ending CNT layer, as depicted in FIG. 5, may be desired. In some embodiments, the ending CNT layer is overcoated with a protective coating or film, such as a plastic or sol-gel coating, as commonly used for protecting surfaces. In the case of an ending metal overlayer, the ending metal overlayer may or may not be coated with a protective overlayer as described above. If an overlayer of metal is to have CNTs deposited thereon, the overlayer of metal should be smooth in the sense provided above for the metal substrate. The metal overlayers may also independently have any of the thicknesses provided above for the metal substrate. The CNTs in each layer beyond the first layer should also have lengthwise dimensions parallel with the metal layer on which they are deposited, as discussed above for CNTs deposited on the metal substrate.

Figure 7:
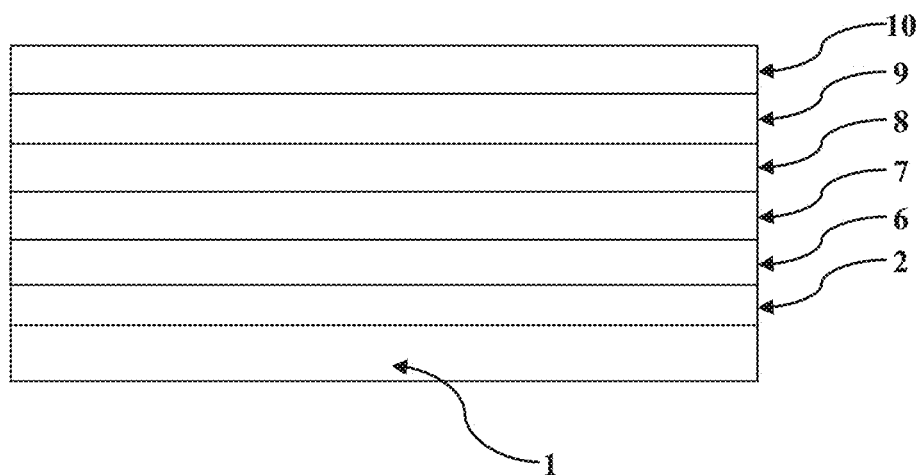
FIG. 7. Drawing showing an exemplary multilayer composite structure building from the multilayer composite structure shown in FIG. 6, wherein an additional (third) CNT layer (9) and third metal overlayer (10) has been added.

Further extended multilayer structures are possible by adding successive numbers of CNT and metal layers in an alternating manner, as described above. For example, building on the multilayer structure shown in FIG. 6, an additional (third) CNT layer (9) and third metal overlayer (10) may be added to provide the multilayer structure shown in FIG. 7. In some embodiments, the multilayer structure included at least three, four, five, or six CNT layers and at least three, four, five, or six metal overlayers, in alternating fashion. In some embodiments, the multilayer structure is subjected to an annealing step after each metal overlayer is deposited; in other embodiments, some or all of the metal overlayers are deposited before the multilayer structure is annealed.

In some embodiments, the metal substrate and metal overlayers in the multilayer structure are all composed of the same composition (e.g., all are copper of the same copper alloy), or the metal substrate and metal overlayers all have at least one element in common (e.g., pure copper for the metal substrate, and copper alloy for the metal overlayers). In other embodiments, at least two metal layers in the multilayer structure have different compositions.

Examples have been set forth below for the purpose of illustration and to describe certain specific embodiments of the invention. However, the scope of this invention is not to be in any way limited by the examples set forth herein.

EXAMPLES

CNT Suspension (Dispersion) Formulations

For sonospraying experiments, a CNT dispersion was prepared that contained a mixture of N,N-dimethylformamide (DMF) and a specially formulated commercial surfactant (Nanosperse™ AC; purchased from NanoLab, Inc.). For air-blade and electrospinning, the CNT dispersion contained a mixture of N-Methyl-2-pyrrolidone (NMP) and Nanosperse™ AC. For all of the droplet deposition methods, 20 mg of CNTs were dispersed in 20 mL of the solvent mixed with 1 mL of Nanosperse™ AC. To further promote an effective dispersion, the CNT/solvent mixture was probe sonicated for 30-second intervals for a total of 1 hour in an ice bath to mediate the high temperatures. The ice bath was filled to the top to ensure that the CNT vessel remains surrounded by ice and remains cool during probing. The probe was 12.7 mm in diameter and was usually inserted about 1 cm into the solution during sonication. After each sonication cycle, the dispersion is kept in an ice bath for five minutes to cool before the next cycle starts. The total sonication time used for each batch was three hours, which includes probing time and cooling down time, which amounts to approximately 1.5 hours of probing. Samples were sonicated with the amplitude control set at 25%.

Sonospray Process

Figure 8:
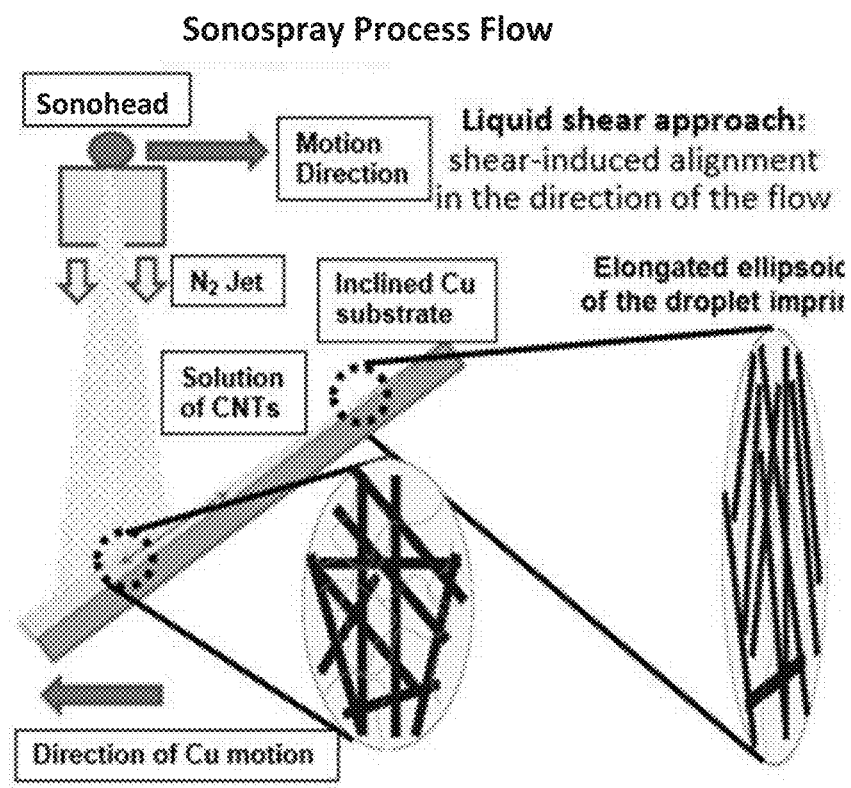
FIG. 8. A general schematic of an exemplary sonospray deposition process of the present invention.

A general schematic of an exemplary sonospray deposition process is provided in FIG. 8. As shown in FIG. 8, two independently controlled syringe pumps were equipped to deliver a CNT suspension to an ultrasonically activated sonohead (controlled by a piezoelectric crystal oscillating at 120 kHz), which generated a mist of the CNT solution in micron-size droplets. A nitrogen jet flowing around the sonohead shaped the mist into round or line dimensions defined by the design of the sonohead (0.3-10 cm). The nitrogen jet carrying the droplets was made to flow in the direction of the metal substrate, with the metal substrate tilted at an angle with respect to the direction of the flowing droplets. When a droplet impinges on the inclined surface of the metal substrate, the droplet forms an elongated ellipsoid shape droplet imprint on the metal surface, which simultaneously aligns nanotubes in the direction of their longest axes. A continuously aligned CNT layer was deposited as the sonohead moves across the substrate. The deposition control parameters include sonohead speed (in the x-y plane), flow rate, deposition height, and the substrate temperature.

Air Knife (Blade) Process

Figure 9:
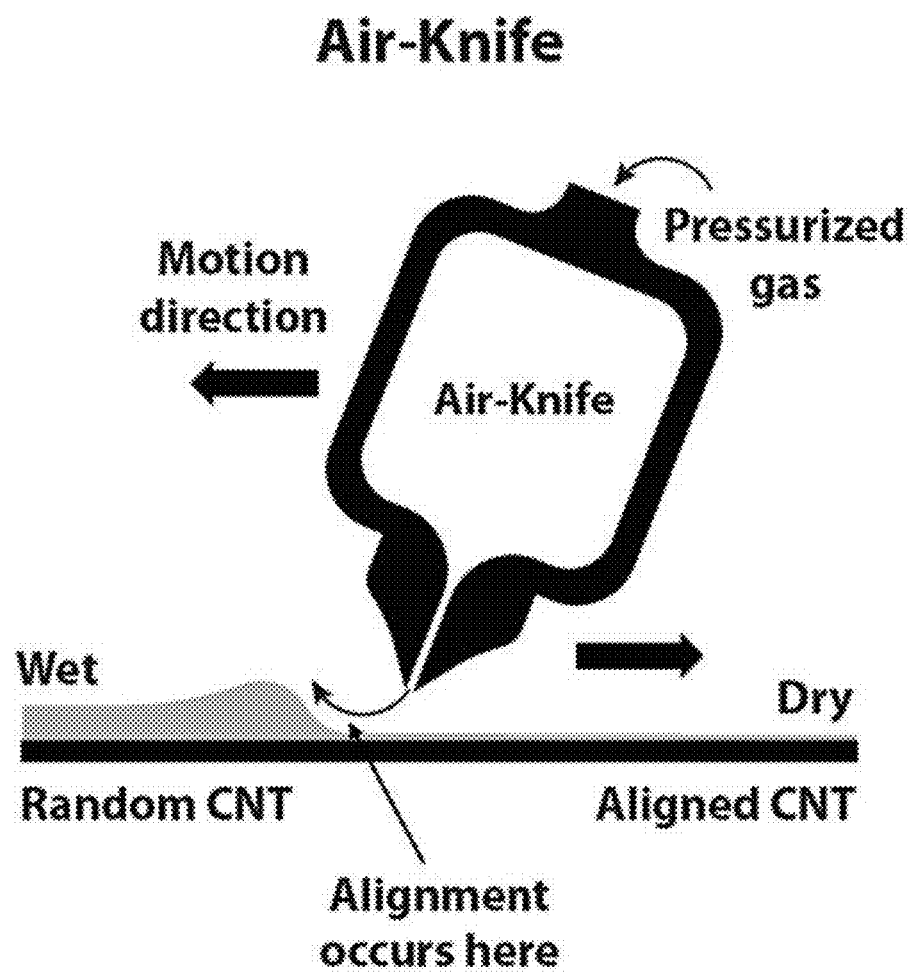
FIG. 9. A general schematic of an exemplary air knife process of the present invention.

A general schematic of an exemplary air knife process is provided in FIG. 9. A well-dispersed CNT suspension was placed on a copper tape. As indicated in FIG. 9, a beveled air blade was moved across the suspension at about a 30-45 degree angle to the surface of the copper tape. The air blade was moved at a substantially even speed over the copper surface to evenly spread the CNT solution and form a CNT coating on the copper tape. A shear-induced alignment results from the compressed gaseous flow that uniformly spreads the CNTs along the horizontally positioned copper tape.

Electrospinning Process

Figure 10:
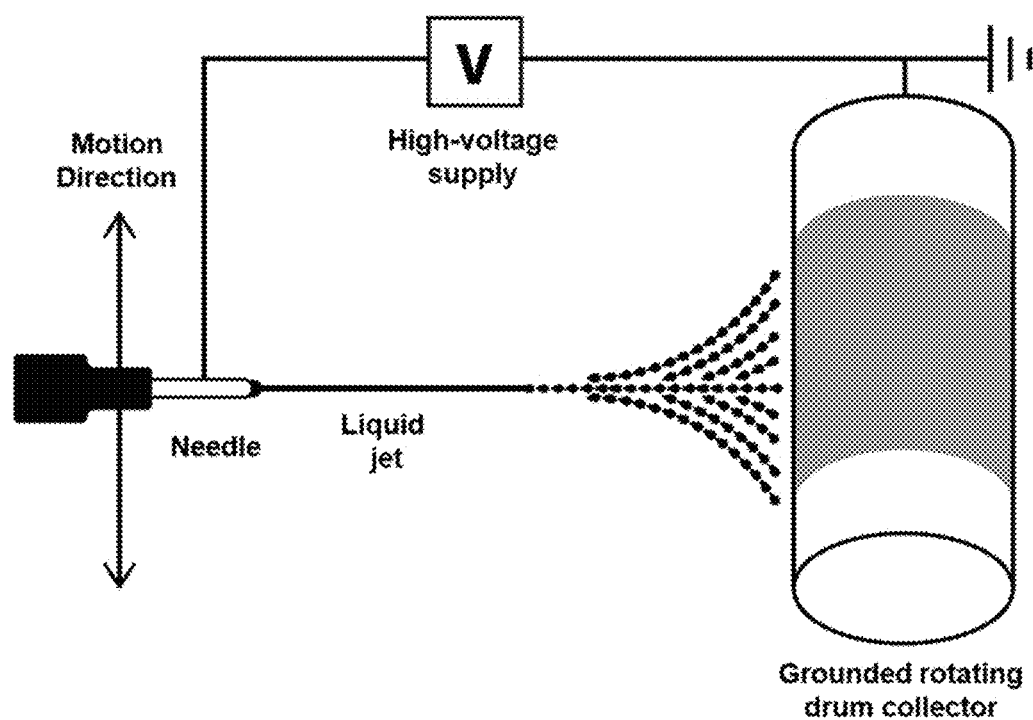
FIG. 10. A general schematic of an exemplary electrospray process of the present invention FIG. 11. A high-resolution field-emission scanning electron microscope (SEM) image of a CNT film produced by a method of the present invention.

A general schematic of an exemplary electrospinning (electrospraying)_process is provided in FIG. 10. As indicated in FIG. 10, a CNT suspension was loaded into a syringe and extruded from the needle tip at a constant rate by a syringe pump onto a copper sheet that is mounted on a rotating drum collector. High voltage was applied between the syringe and collector to induce droplet elongation along the deposition direction. Specifically, at a high voltage (typically ranging from 5 to 20 kV), liquid droplets containing CNTs become charged and fly to the collector (i.e., the copper sheet). Due to the electrostatic force, the charged droplets split apart and homogeneously "electrospray" onto the rotating drum covered by the copper sheet. By this process, a rapidly rotating collector resulted in deposition of CNTs that showed some degree of alignment. A CNT concentration of 0.5 mg/mL, combined with feeding rates ranging from 0.1 to 0.3 mL/h, yielded copper tapes that were homogenously coated.

Characterization of the Resulting CNT Films

Figure 11:
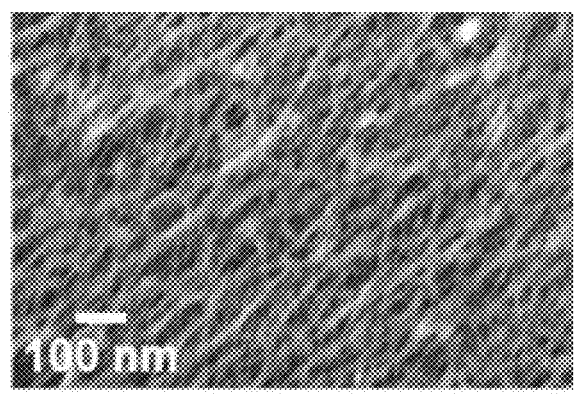

Microscopic Imaging:

A high-resolution field-emission type scanning electron microscope (SEM) was used to elucidate the plan-view surface morphology of the CNT films. FIG. 11 is a SEM micrograph of a CNT film produced by the sonospray process. As shown in FIG. 11, alignment of CNTs is evident along the length of the Cu tape (i.e., along the deposition direction).

Figure 12:
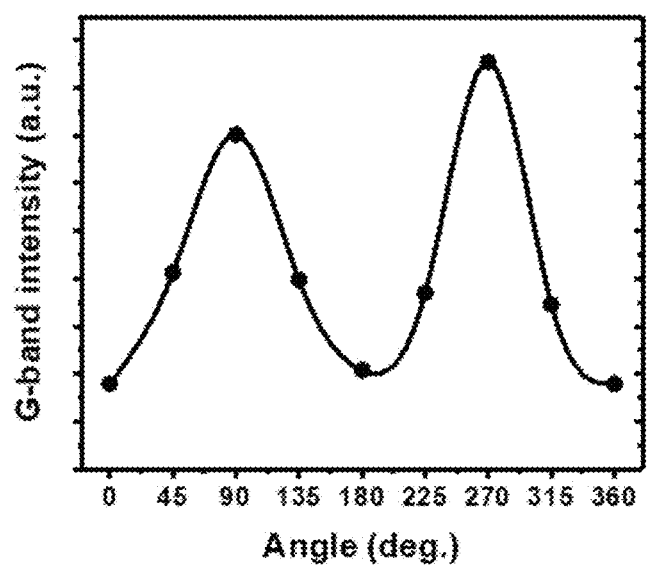
FIG. 12. A plot of data from polarized confocal Raman spectroscopy of a CNT film produced by a method of the present invention, where the degree of nanotube alignment can be ascertained by changes in the intensity of G- and D-bands of the CNTs, tangential shear mode of carbon atoms and longitudinal optical (LO) phonon mode. The intensity of G- and D-bands of CNTs are highest when the CNTs are parallel to the laser polarization direction.

Degree of CNT Alignment:

The degree of nanotube alignment resulting from the sonospray method was analyzed by polarized confocal Raman spectroscopy, where the intensity of G- and D-bands of CNTs are highest when nanotubes are parallel to the laser polarization direction. The results are plotted in FIG. 12, which shows the G-Band intensities as a function of sample orientation angle. Variations in the intensity of the G-band are shown with respect to sample orientation, where the polarized beam intensity peaks at roughly 180° intervals, which indicates alignment of the CNTs along the coating direction. G-bands are related to the tangential motion of the carbon atoms on the surface of the nanotube. The D band originates from a hybridized vibrational mode associated with graphene edges and it indicates the presence of some disorder to the graphene structure. This band is often referred to as the disorder band or the defect band and its intensity relative to that of the G band is often used as a measure of the quality with nanotubes.

Figure 13:
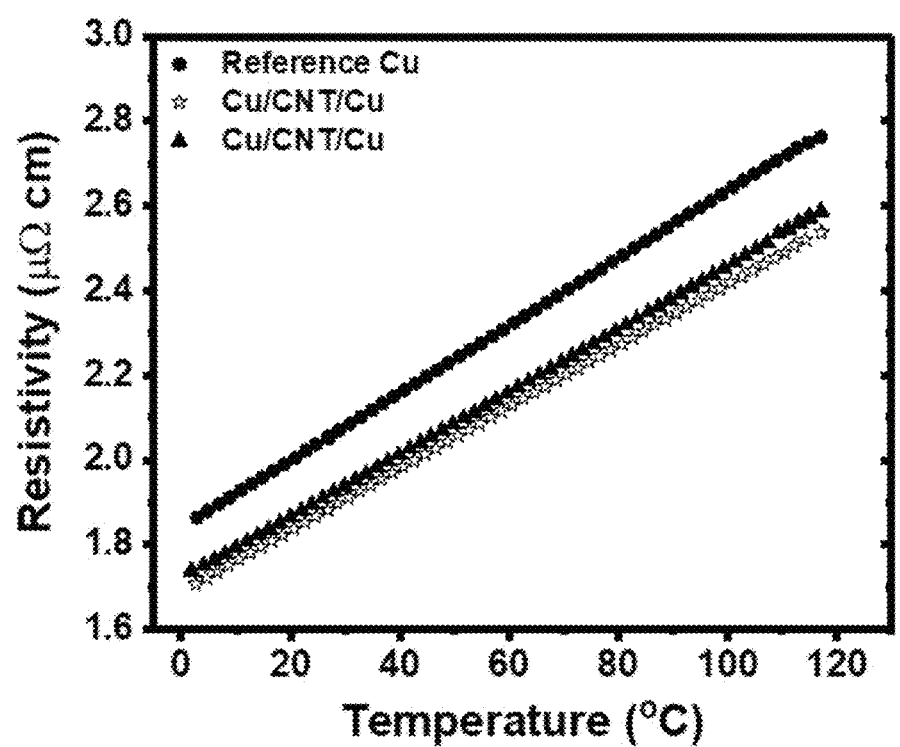
FIG. 13. A plot of the electrical properties of Cu-CNT composites characterized in the temperature range of 0° C. to 120° C. using a physical property measurement system (PPMS).

Electrical Properties:

Electrical properties of the Cu-CNT composites were characterized in the temperature range from 0° C. to 120° C. using a physical property measurement system (PPMS). FIG. 13 shows the resistive behavior of several Cu/CNT/Cu samples demonstrating a reduction in electrical resistivity over the temperature range compared to that of the reference pure copper sample. Both samples were produced by a sonospray method using the same batch of CNTs.

While there have been shown and described what are at present considered the preferred embodiments of the invention, those skilled in the art may make various changes and modifications which remain within the scope of the invention defined by the appended claims.

What is claimed is:

1. A method for producing a carbon nanotube-metal composite in which carbon nanotubes are layered on a metal substrate, the method comprising:
   (i) spreading a liquid in which carbon nanotubes are suspended over said metal substrate;
   (ii) during or after step (i), subjecting said liquid, while spread over said metal substrate, to a shearing force sufficient to spatially confine the liquid suspension to induce at least partial alignment of said carbon nanotubes;
   (iii) removal of said liquid to produce said carbon nanotube-metal composite; wherein, after step (iii), the lengthwise dimensions of said carbon nanotubes are adhered to and oriented parallel with said metal surface, and said carbon nanotubes are at least partially aligned with each other;
   (iv) coating a layer of metal onto the at least partially aligned carbon nanotubes to result in said carbon nanotubes sandwiched between said metal substrate and an overlayer of said metal; and
   (v) coating said overlayer of metal with a second coating of carbon nanotubes according to steps (i)-(iii).

2. The method of claim 1, wherein the method comprises:
   (i) producing droplets of a liquid in which carbon nanotubes are suspended;
   (ii) depositing said droplets onto said metal substrate;
   (iii) during or after step (ii), subjecting said droplets to a shearing force sufficient to elongate said droplets and induce at least partial alignment of said carbon nanotubes on said metal substrate; and
   (iv) removal of said liquid to produce said carbon nanotube-metal composite;
   wherein, after step (iv), the lengthwise dimensions of said carbon nanotubes are adhered to and oriented parallel with said metal surface, and said carbon nanotubes are at least partially aligned with each other.

3. The method of claim 2, wherein said shearing force is provided by a sonospray method in which ultrasound generates said droplets, and a gaseous jet carries the droplets to the metal substrate with sufficient force to elongate said droplets, and wherein said metal substrate is oriented at a substantially oblique angle to the direction of the gaseous jet.

4. The method of claim 3, wherein said gaseous jet carrying said droplets is moved across the surface of the metal substrate, and/or said metal substrate is moved while said gaseous jet carries said droplets, in order to deposit said carbon nanotubes across a desired surface area of said metal substrate.

5. The method of claim 1, wherein said shearing force is provided by an air knife method in which gaseous flow impinges on said liquid suspension at an oblique angle to spatially confine said liquid suspension when said liquid suspension is spread over as a continuous film over said area of said metal substrate.

6. The method of claim 2, wherein said shearing force is provided by an electrospraying method in which a voltage drop is established between said droplets and said metal substrate when said droplets are not in contact with said metal substrate, wherein said voltage drop is of sufficient magnitude to render the droplets electrically charged, and wherein the charged droplets are attracted to and impinge on said metal substrate, which bears a charge opposite the charge on the droplets, while said metal substrate is moving at a speed that induces elongation of said droplets when said droplets impinge on said metal substrate.

7. The method of claim 1, wherein said overlayer of metal has a thickness of 10-5000 nm.

8. The method of claim 1, further comprising coating said overlayer of metal with a second coating of carbon nanotubes according to steps (i)-(iii) and coating said second coating of carbon nanotubes with a second overlayer of metal, to result in a carbon nanotube-metal composite possessing a multilayer structure by having at least two separate layers of carbon nanotubes, with each layer of carbon nanotubes sandwiched by layers of metal, wherein the bottom-most layer of metal is said metal substrate.

9. The method of claim 8, wherein the multilayer structure is subjected to a post-annealing step in which the multilayer structure is subjected to a temperature of about 300-1000° C.

for a time sufficient to result in substantial diffusion of metal into voids between the carbon nanotubes and metal, thereby substantially eliminating such voids.

10. The method of claim 9, wherein said post-annealing step is conducted in an atmosphere having a reduced level of oxygen.

11. The method of claim 1, wherein said metal substrate is a metal-containing foil, tape, or wire.

12. The method of claim 11, wherein said metal-containing foil, tape, or wire has a thickness of at least 1 micron.

13. The method of claim 11, wherein said metal-containing foil, tape, or wire has a thickness of at least 10 microns.

14. The method of claim 11, wherein said metal-containing foil, tape, or wire has a thickness of at least 25 microns.

15. The method of claim 1, wherein said carbon nanotubes are included in an amount of at least 1 vol % by volume of the carbon nanotube-metal composite.

16. The method of claim 1, wherein said carbon nanotubes are sufficiently aligned to result in said carbon nanotube-metal composite possessing room temperature electrical and thermal conductivities exceeding those of the metal alone.

17. The method of claim 1, wherein a surfactant is included in said liquid suspension to improve dispersion of carbon nanotubes in the liquid suspension and to induce deformability of said liquid suspension when subjected to said shearing force.

18. The method of claim 2, wherein said droplets are produced from a feed solution containing said liquid in which carbon nanotubes are suspended, and said feed solution is contained in and delivered from a syringe pump.

19. The method of claim 1, wherein said metal comprises an element selected from the group consisting of copper, titanium, iron, cobalt, nickel, zinc, palladium, platinum, silver, gold, rhodium, iridium, ruthenium, magnesium, silicon, germanium, and tin.

20. The method of claim 1, wherein said metal comprises copper.

21. A method for producing a carbon nanotube-metal composite in which carbon nanotubes are layered on a metal substrate, the method comprising:
(i) spreading a liquid in which carbon nanotubes are suspended over said metal substrate;
(ii) during or after step (i), subjecting said liquid, while spread over said metal substrate, to a shearing force sufficient to spatially confine the liquid suspension to induce at least partial alignment of said carbon nanotubes;
(iii) removal of said liquid to produce said carbon nanotube-metal composite; wherein, after step (iii), the lengthwise dimensions of said carbon nanotubes are adhered to and oriented parallel with said metal surface, and said carbon nanotubes are at least partially aligned with each other; and
(iv) coating a layer of metal onto the at least partially aligned carbon nanotubes to result in said carbon nanotubes sandwiched between said metal substrate and an overlayer of said metal, wherein said overlayer of metal is deposited by sputter deposition.

* * * * *